Nov. 12, 1935.   W. P. LEAR   2,020,420
AUTOMOBILE RADIO CONTROL
Filed July 7, 1930

Inventor:
William P. Lear
By Williams, Bradbury, McCaleb & Hinkle   Attys.

Patented Nov. 12, 1935

2,020,420

UNITED STATES PATENT OFFICE 2,020,420

AUTOMOBILE RADIO CONTROL

William P. Lear, Chicago, Ill., assignor to Galvin Manufacturing Corporation, Chicago, Ill., a corporation of Illinois Application July 7, 1930, Serial No. 465,928

2 Claims. (Cl. 250—14)

This invention relates, in general, to radio sets or systems and it pertains more particularly to a novel remote control device for automobile radio receiving sets or systems.

An important object of the present invention is the provision of a remote control attachment for vehicle radio sets so positioned in and attached to a vehicle as to be readily accessible by the operator of the vehicle.

Another important object of this invention is the provision of a novel automobile radio control device which may be adjustably attached to the steering post of the automobile.

Still another important object of the invention is the provision of such a control device for automobile radio sets mechanically and electrically connectible to the receiving set, which may be attached to the automobile without marring or requiring a re-design or re-arrangement of the automobile control panel or dashboard.

A further object of the invention is the provision of a novel automobile radio control device so positioned in and attached to the automobile as not to require the driver to shift from the driving position in order to operate the control device, whereby to promote safety or to decrease the accident hazard involved in a driver dividing his attention between the controls of the automobile and the radio controls.

Other objects and advantages of the invention will be apparent from the following detailed description.

In automobile radio sets, the control devices of the radio set should be positioned so as not to require the driver of the automobile to change or shift his driving position in order to operate the radio control devices because the attention of the driver, from the standpoint of safe operation of the automobile, is required by the controls of the automobile. If, therefore, it is necessary for the driver to lean over or away from the steering mechanism of the automobile in order to operate the radio set, the operation of such a set or system is an accident hazard or a menace to safe operation of an automobile.

The present invention, therefore, briefly contemplates the provision of a control device or attachment for automobile radio sets, so positioned in the automobile as to be readily accessible to the driver without necessitating his leaning over or away from the steering wheel in order to control the radio set and without diverting his attention from the automobile controls. Further, as is well known in the art to which this invention pertains, automobile dashboards are not designed to accommodate the addition of radio control devices and the mounting of such devices on the dashboard would mar the appearance and confuse the operator.

Figure 1:
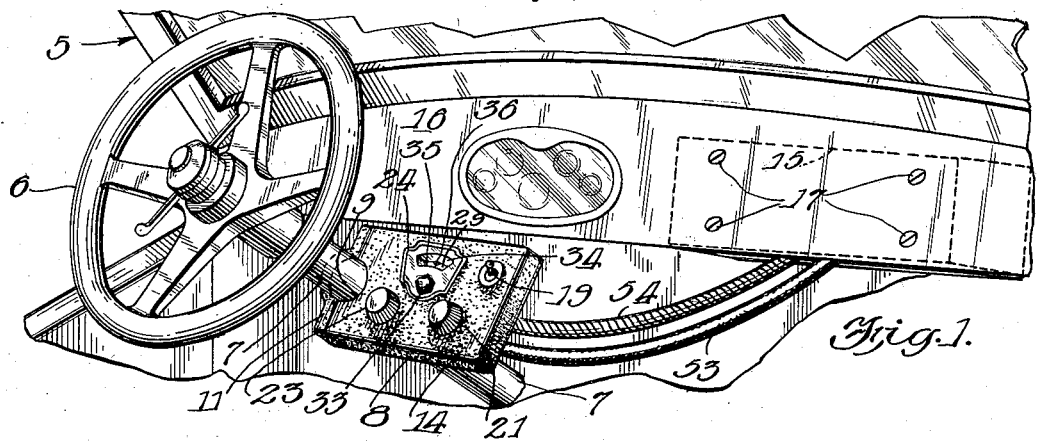
Fig. 1 is a partial view in perspective of the driver's compartment of an automobile, showing the novel radio control device of the invention.

According to the present invention, an automobile, designated generally by the reference character 5, is shown in Fig. 1 and is provided with a usual steering mechanism 6 carried at the upper end of a steering post or column 7. The steering post 7 has mounted thereon a control unit having a casing 8 provided with an end formed inwardly, as at 9, to engage a portion of the steering post 7. The casing 8 may be cast or otherwise suitably formed of metal and may be attached at any desired height to the post 7 by means of a clamp 11 having an arcuate portion 12 complementary to the inwardly formed portion 9 of the casing 8, the portion 9 and the clamp 11 embracing a portion of the steering post. This clamp 11 is attached to the casing 8 about the post 7 by means of bolt and nut assemblies 13 arranged at opposite sides of the arcuate portion 12 of the clamp.

The casing 8 includes a top side 14 adapted to serve as a control panel for a radio receiving set illustrated by dotted lines 15 in Fig. 1 mounted at any suitable place in the automobile 5 such as to a dashboard 16 of the automobile by means of through bolts or screws 17. As already mentioned, the control panel 14 forms the top of the casing 8 and is adapted to carry a control or "on and off" switch 18 suspended from the control panel in a usual manner. This control switch 18 may be of the key-operated type or, as illustrated, may be provided with an operating handle or lever 19 on the control panel.

A volume control knob or handle 21 on the panel 14 is operably connected to a volume control means such as a rheostat 22 suspended from the panel 14 inside of the casing 8 for the purpose of adjusting the volume of the received signal. In addition to the volume control knob 21 a tuning knob or handle 23 and an escutcheon 24 are carried on the control panel 14 for tuning the set and for finishing a dial aperture 25 in the control panel 14, respectively.

Figure 2:
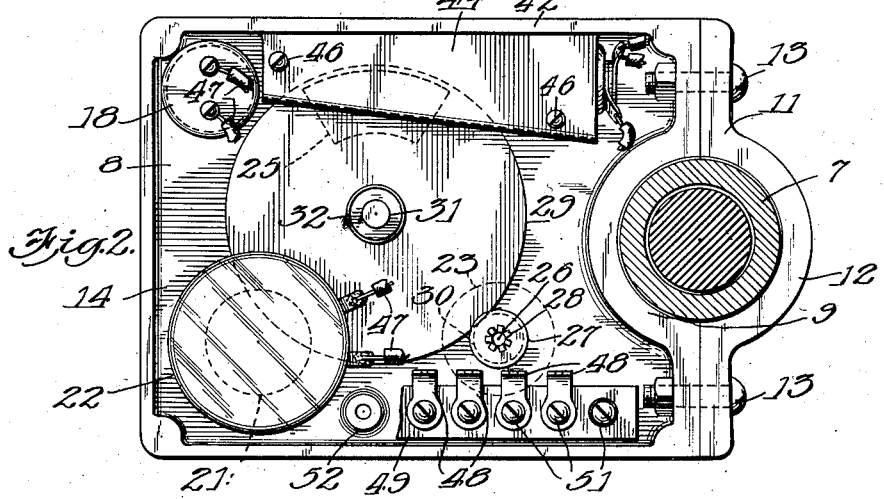
Fig. 2 is an enlarged bottom plan view of the control device of Fig. 1 with the cover removed.

The tuning knob 23 is operably connected to a spindle 26 extending through the control panel 14 into the casing 8 and carrying a friction spool or cylinder 27 secured to the inner end of the spindle 26 by any suitable means such as drilling out the end of the spindle and bending or bradding this end outwardly over the top of the friction spool 27 as shown at 28 in Fig. 2. This friction spool 27 drives a dial disc or indicator 29, the spool having a peripheral groove or slot 30 engaging the indicator for this purpose and the indicator 29 being secured on a stub shaft 31 by means of a collar or sleeve 32 secured on the shaft 31. This shaft 31 extends outwardly through the control panel 14 and carries at its outer end the escutcheon 24 suitably secured on the shaft by means of a nut 33.

This escutcheon 24 has an inwardly formed or recessed portion 34 adapted to be received in the sight aperture 25 of the top 14. In the bottom of the inwardly formed or recessed portion there is an aperture 35 exposing a portion of the tuning dial or indicator 29. A side of the recessed portion 34 is provided with an indicator or pointer 36 adjacent the dial 29 for indicating the tuning position of this dial.

Figure 3:
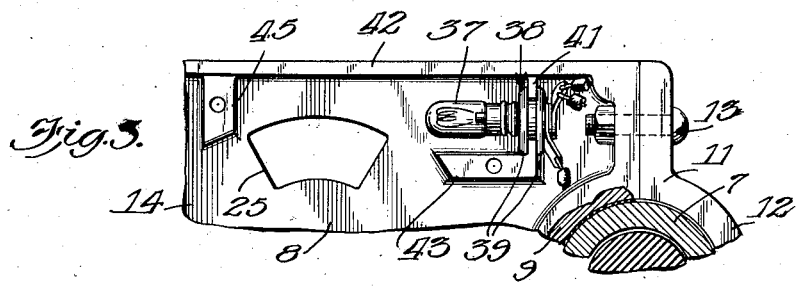
Fig. 3 is a fragmentary view similar to Fig. 2, showing certain assembly details.

For the purpose of illuminating the dial 29 a dial light 37, see Fig. 3, is provided with an insulating bushing 38 having spaced flanges 39 engaging opposite sides of a lug 41 projecting inwardly from a side 42 of the casing and a substantially L-shaped lug 43 depending from the lower face of the control panel 14. This light 37 so mounted is adapted to illuminate the dial 29 and is separately enclosed by a separating or cover plate 44 secured at one end to a lug 45 projecting inwardly from the side 42 and at its other end to the L-shaped lug 43 by means of retaining screws 46. This cover plate 44 confines the light from the source 37 to prevent it from shining in the driver's compartment and interfering with his vision. The plate 44 also serves to protect the light 37 against mechanical injury.

The circuit control means, that is, the "on and off" switch 18 and the volume control rheostat 22, together with the dial light 37, are provided with electrical conductors 47 adapted to be connected to the radio set 15. To facilitate such connection the conductors 47 may be connected to lug terminals 48 carried on an insulating terminal strip 49 mounted in the casing 8 by means of screws 51 threading into depending studs 52 at each end of the strip 49 so that the conductors of a cable 53 may be suitably connected to the circuit control means in the casing 8 whereby to permit the control of the radio set 15.

In order to tune the radio set 15, the control unit is mechanically connected to the set in any suitable manner, preferably, however, as shown more particularly in Figs. 1 and 2, a flexible connection 54 extending between the tuning apparatus in the radio set and the friction spool 27 in the casing 8. While the flexible connection 54 per se forms no part of the present invention, it may be well, by way of explanation, to mention that essentially it consists of concentrically arranged tubes, each comprising a helically formed metal strip or wire, the inner tube being rotatable. This inner tube may be provided at each end with a ratchet, for engaging a gear to drive or rotate the tuning means of the receiving set. As shown, however, the inner tube is adapted to frictionally engage about the spool 27 and may be suitably clamped thereon so that in tuning the receiving set by rotating the tuning knob 23, the friction spool 27 rotates the inner tube and tunes the set and at the same time drives or rotates the dial 29 which indicates through the aperture 35 the tuned condition of the set.

Thus, the remote control device of the invention may be clamped to the steering post of an automobile and adjustably positioned longitudinally of the post to accommodate the requirements of different drivers as to the height of the control device, and being on the steering post it is readily accessible to the driver without making it necessary for him to change his driving position in order to manipulate the controls of the receiving set. Such a mounting of an automobile radio control device contributes to safety by virtue of the fact that it does not divert the driver's attention from the controls of the automobile but is mounted within easy reach of the driver. As described, the circuit control devices or means suspended from the control panel or top of the casing are electrically connected to the radio receiving set and the tuning actuating means drives the radio tuning means and the tuning dial remotely positioned with respect to the tuning means.

While I have illustrated and described a preferred embodiment of my invention, many modifications may be made without departing from the spirit of the invention and I do not wish to be limited to the precise details of construction set forth but desire to avail myself of all changes within the scope of the appended claims.

Having thus described my invention, what I claim and desire to secure by United States Letters Patent is:

1. An automobile radio control unit for attachment to the steering column of an automobile, comprising a control panel extending laterally from one side of said steering column and having a sight aperture therein, a rotatable tuning indicating dial under said control panel and at a side of said steering column, said dial being visible through said sight aperture, tuning operating means at the opposite side of said control panel from said dial, having driving engagement with said dial under said control panel, flexible tuning means connected to said tuning operating means under said control panel for joint operation with said dial by said operating means, and radio control means on said panel at the same side of said steering column as said dial and said tuning operating means.

2. An automobile radio control unit for attachment to the steering column of an automobile, comprising a control panel, circuit control and tuner operating devices suspended from the under side of said panel and connectible with an automobile radio, operating means for said circuit control and tuner operating devices at the opposite side of said panel, operably connected to said devices, and casing means adapted to be mounted on the steering column for carrying said control panel at a side of the steering column whereby to position said operating means for said circuit control and tuner operating devices at the same side of said steering column.

WILLIAM P. LEAR.